Nov. 15, 1966 H. BÜTTEL 3,284,876
METHOD OF SEALING CONTACT REEDS IN A GLASS TUBE
Filed Sept. 12, 1962 12 Sheets-Sheet 1
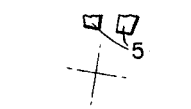
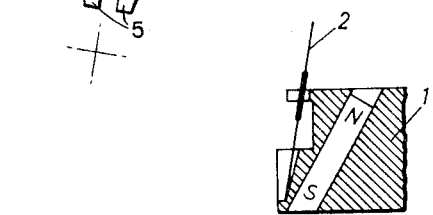
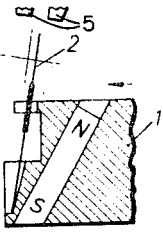
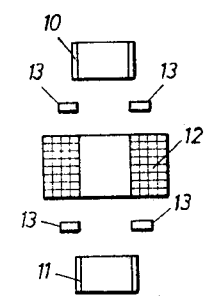
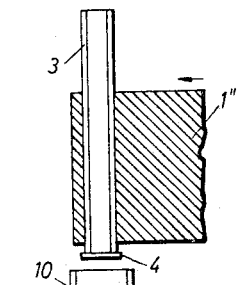
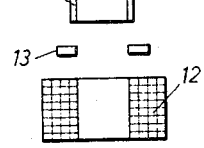
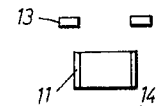
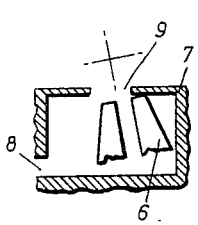
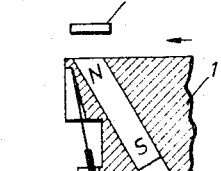
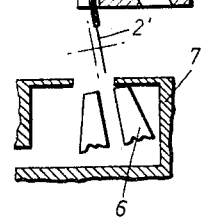
Fig.1    Fig.2
INVENTOR
HELMUT BÜTTEL
BY
ATTORNEY Nov. 15, 1966  H. BÜTTEL  3,284,876
METHOD OF SEALING CONTACT REEDS IN A GLASS TUBE
Filed Sept. 12, 1962  12 Sheets-Sheet 2

INVENTOR
HELMUT BÜTTEL

BY
ATTORNEY

Nov. 15, 1966  H. BÜTTEL  3,284,876
METHOD OF SEALING CONTACT REEDS IN A GLASS TUBE
Filed Sept. 12, 1962  12 Sheets-Sheet 3

INVENTOR
HELMUT BÜTTEL

BY
ATTORNEY

Nov. 15, 1966 H. BÜTTEL 3,284,876
METHOD OF SEALING CONTACT REEDS IN A GLASS TUBE
Filed Sept. 12, 1962 12 Sheets-Sheet 4
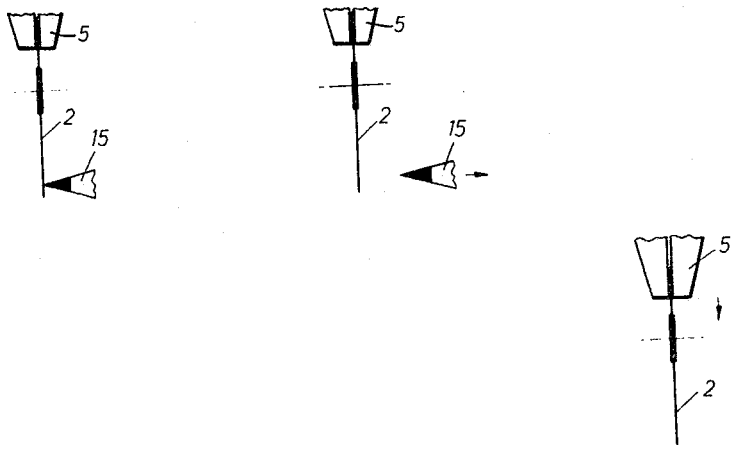
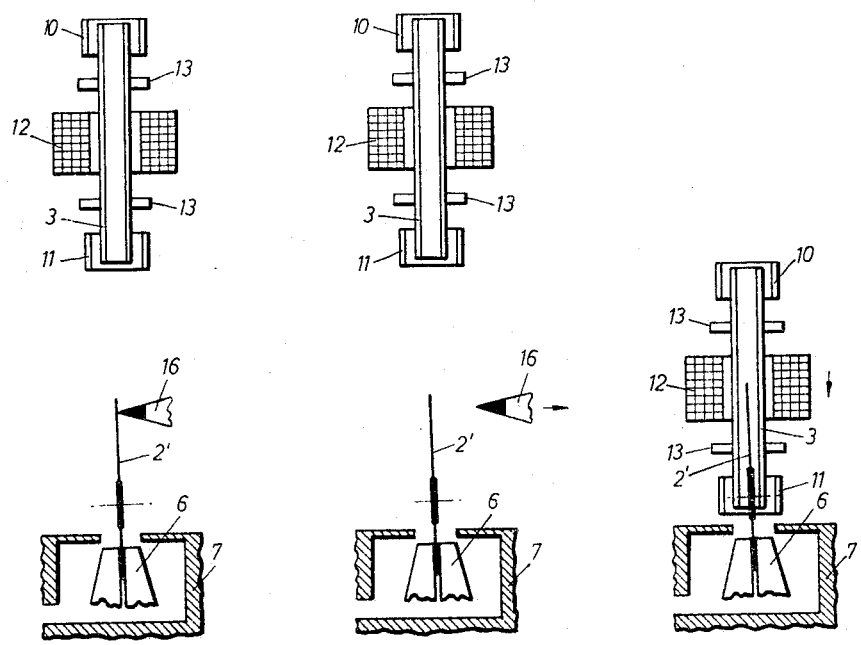
Fig. 9　　　Fig. 10　　　Fig. 11
INVENTOR
HELMUT BÜTTEL
BY
ATTORNEY Nov. 15, 1966  H. BÜTTEL  3,284,876
METHOD OF SEALING CONTACT REEDS IN A GLASS TUBE
Filed Sept. 12, 1962  12 Sheets-Sheet 5

INVENTOR
HELMUT BÜTTEL

BY

ATTORNEY

INVENTOR
HELMUT BÜTTEL
BY
ATTORNEY

Nov. 15, 1966     H. BÜTTEL     3,284,876
METHOD OF SEALING CONTACT REEDS IN A GLASS TUBE
Filed Sept. 12, 1962     12 Sheets-Sheet 7

INVENTOR
HELMUT BÜTTEL

BY

ATTORNEY

Nov. 15, 1966          H. BÜTTEL          3,284,876
METHOD OF SEALING CONTACT REEDS IN A GLASS TUBE
Filed Sept. 12, 1962          12 Sheets-Sheet 9

INVENTOR
HELMUT BÜTTEL

BY *[signature]*

ATTORNEY

Nov. 15, 1966       H. BÜTTEL       3,284,876
METHOD OF SEALING CONTACT REEDS IN A GLASS TUBE
Filed Sept. 12, 1962       12 Sheets-Sheet 11
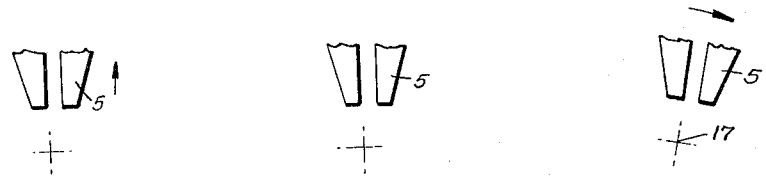
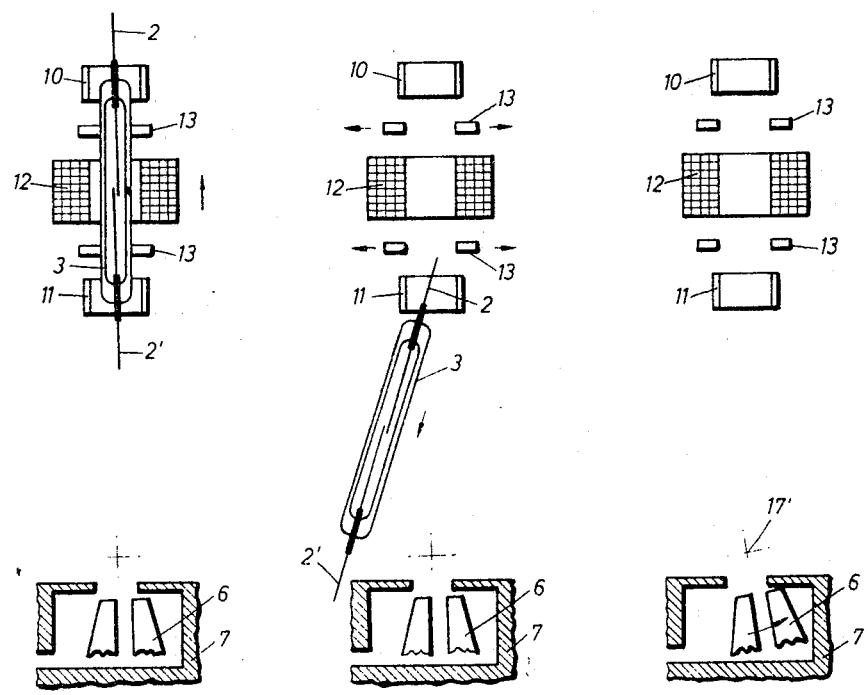
Fig.36        Fig.37        Fig.38
INVENTOR
HELMUT BÜTTEL
BY
ATTORNEY Nov. 15, 1966          H. BÜTTEL          3,284,876

METHOD OF SEALING CONTACT REEDS IN A GLASS TUBE

Filed Sept. 12, 1962          12 Sheets-Sheet 12

INVENTOR

HELMUT BÜTTEL

ATTORNEY

United States Patent Office 3,284,876
Patented Nov. 15, 1966

3,284,876
METHOD OF SEALING CONTACT REEDS
IN A GLASS TUBE
Helmut Büttel, Korntal, Wurttemberg, Germany, assignor to International Standard Electric Corporation, New York, N.Y., a corporation of Delaware
Filed Sept. 12, 1962, Ser. No. 223,068
Claims priority, application Switzerland, Sept. 21, 1961, 10,982/61
2 Claims. (Cl. 29—155.5)

The present invention relates to a method of and device for sealing reeds or contact tongues in a glass tube in the course of manufacturing hermetically sealed reed contacts.

One method of manufacturing reed relays comprising hermetically sealed contacts is known, wherein the reeds are placed in stationary clamping tools, such as a collet or pliers, which are only capable of being moved linearly. With the aid of these clamping tools the reeds are introduced into a small glass tube, the upper end of which is sealed first, and the lower end is sealed after adjustment of the contact airgap.

This conventional method, however, has the disadvantage that excessive tolerances appear during the manufacturing process, which cause a considerable wastage. In the previously used, semi-automatic or automatic sealing machines, the reed is clamped at the soldering end in such a way, that any twisting will cause an asymmetry of the contacting point. Since, for the purpose of achieving parallel contact surfaces, the upper reed is magnetically retained at the lower reed during the sealing process, this asymmetry has an increased effect upon the shape of the upper sealing point.

The present invention overcomes the disadvantages of this conventional type of manufacturing process. The primary object of the invention is therefore to provide increased protection against glass cracks by causing the cylindrical portion of the reed to lie in the center of the sealing bead. This is accomplished in that prior to the sealing of the upper and the lower reed at respective ends of the glass tube, an adjusting process is used consisting of several automatically controlled manufacturing steps. Subsequent to withdrawal of the feeding devices for the reeds, adjusting contacts are introduced, and the upper and lower clamping tools, together with the clamped reeds, either simultaneously or individually, perform a rotary movement toward the adjusting contacts. Upon establishment of a contact between the respective adjusting contacts and the reeds clamped into the upper and the lower clamping tool, this rotary movement of the clamping tools is terminated independently of one another; and thereafter the adjusting contacts are removed from the tool.

In another part of the operation, the clamping tool holding the upper reed, remains closed during the sealing operation. Subsequent to the sealing of the upper reed, during the cooling period, sealing of the lower end is started. The process is then interrupted to permit adjusting the airgap between the reed contacts. As another feature, both the upper and the lower tools clamping the reeds at their soldering terminals, are capable of being rotated within a radius about the sealing point between the glass tube and the respective reed. The glass tube is retained in a center position with the aid of collets or tongs. As another feature, the reed-receiving portion of the feeding device is formed so that the reed is retained by a permanent magnet and prism-like guides, and is brought into a predetermined position. In addition, an adjusting coil is arranged at the reed overlapping point and is surrounded by an external magnetic flux-return device, to concentrate the magnetic field of the adjustment excitation.

Both the method and the device of the invention result in the advantages that the reeds can be sealed into the center of the glass tube with a proper glass bead, that the connection at the sealing point between the glass and the reed is an intimate one, that the sealing point is symmetrical with respect to all sides, and that the reeds lie exactly in the center of the glass tube. Independently of any tolerances in the diameter of the glass tube, an exact position of the center axis of the tube extending in the longitudinal direction, is always achieved in relation to the reeds to be sealed. Any reeds which are bent at the sides, are aligned by the feeding device at both the contacting side and at the sealing point, and are introduced into the clamping jaws of the tool performing the clamping with its broad side.

By shifting several steps of the manufacturing operation into the cooling period of the upper sealing point, it is possible to achieve shorter manufacturing times. The magnetic holding of the reeds in the feeder devices serves to simplify the process of receiving the reeds by the clamping tool. By correspondingly designing the device for carrying out the method, and by the clamping tools being pivoted and capable of rotation in a radius about the sealing point between the glass tube and the respective reed, the reeds are secured in an adjusted position during the adjustment of the airgap between the contact-making ends of the reeds. The reeds themselves, which are located in the center of the glass tube, thus cannot be removed from this adjusted position. However, variation of the airgap at the overlapping point of the reeds is still possible without having to effect a lateral displacement of the reeds at the sealing point.

With the aid of a permanent magnet built into the feeding device and the use of prism-like guides, the position of the reeds in the feeding device can be exactly defined prior to the reception by the clamping tools. The adjusting coil which is provided with the flux-return means, serves to concentrate the magnetic field exactly upon the overlapping point of the reeds, so that any variations with respect to the rated values, which might be due to different magnetic resistances or heating throughout the entire length of the reeds, can be reliably avoided.

The invention will now be described in detail with reference to FIGS. 1–46 of the accompanying drawings, in which:

FIG. 1 shows parts of the device in a preliminary position with the reed contacts inserted in the feeding device, as well as the small glass tubes, FIG. 2 shows the stage of introducing the feeding device to the machine, FIG. 3 shows the stage of introducing the reeds to the opened clamping tools as well as the dropping of the glass tube against the limit stop in the opened glass-tube holding devices, FIG. 4 shows the receiving of the reeds from the feeding device, as well as the clamping of the reeds by the clamping tools, FIG. 5 shows the clamping of the glass tube, as well as the removal of the feeding devices from the clamping tools, FIG. 6 shows the removal of the feeding devices from the machine, FIG. 7 shows the insertion of the adjusting contacts, FIG. 8 shows the rotary movement of the clamping tools in direction towards the adjusting contacts, FIG. 9 shows the contact establishment between the adjusting contacts and the reeds, FIG. 10 shows the removal of the adjusting contacts from the machine, FIG. 11 shows the closing of the machine, FIG. 12 shows the position for starting of the program drum while the machine is in the closed condition, FIG. 13 shows the feeding-in of a strong protective gas, FIG. 14 shows the switching-on of the upper oven, FIG. 15 shows the switching-on of the holding field, FIG. 16 shows the opening of the upper clamping tool, FIG. 17 shows the switching-off of the upper oven, FIG. 18 shows the switching-on of the lower oven, FIG. 19 shows the feeding-in of a weak protective gas, FIG. 20 shows the switching-off of the holding field, FIG. 21 shows the turning-back of the lower reed, FIG. 22 shows the displacement of the glass tube with the sealed upper reed, FIG. 23 shows the application of the sensing or feeling device to the upper reed, FIG. 24 shows the switching-on of the adjusting field, FIG. 25 shows the switching-off of the lower oven, FIG. 26 shows the shutting-off of the protective gas, FIG. 27 shows the twisting of the lower reed with respect to the upper reed, FIG. 28 shows the stopping of the rotary movement of the lower clamping tool after a contact has been established between the two reeds, FIG. 29 shows the switching-on of the lower oven, FIG. 30 shows the switch-off of the adjusting field, FIG. 31 shows the switching-off of the lower oven, FIG. 32 shows the withdrawal of the feeling or sensing devices from the upper reed, FIG. 33 shows the stage of cooling the lower sealing point, FIG. 34 shows the opening of the machine, FIG. 35 shows the opening of the lower clamping tool, FIG. 36 shows the machine in the opened condition, FIG. 37 shows the opening of the glass-tube holding device, FIG. 38 shows the turning-back of these holding devices into their normal position for loading the feeder device, FIG. 39 shows part of the machine subsequent to the termination of the pre-adjustment, FIG. 40 shows part of the feeder device with a reed in position, as well as a clamping tool which is ready to receive, in both a side and sectional view, FIG. 41 shows part of the feeder device according to FIG. 40, in a front view, FIG. 42 is a top view showing part of the feeder device, comprising a prism-like reed-receiving means, FIGS. 43–45 show the adjusting process necessary for aligning the reeds, and FIG. 46 shows the adjusting coil arranged at the level of the reed overlap, comprising an external magnetic flux concentrating device.

The sealing process including the pre-adjustment is schematically shown in FIGS. 1 to 38 by way of sequential steps of operation. At each time only the most important components of the machine are shown. Those components or parts which are only of minor importance with respect to the operating sequence, or which are not required for the particular cycle, are omitted in the respective drawings for the sake of enabling a better understanding of the entire operation.

In FIG. 1 the references 1, 1', 1" indicate parts of the feeder device; the feeder for the upper reed or contact tongue 2 being indicated by the reference numeral 1, the feeder for the lower reed 2' by the reference numeral 1', and the feeder for the small glass tube 3 by reference numeral 1". On the feeder 1" for the glass tube there is arranged a slide 4 on which is mounted the glass tube 3 that is inserted in the feeder 1". The parts of the machine which are most important with respect to the further sealing process, are the upper clamping tool 5, the lower clamping tool 6, and the lower capsule 7 containing tool 6. This lower capsule 7 is provided with two openings; opening 8 serving to feed in the protective gas, and the opening 9 serving as the outlet of the protective gas. The upper clamping tool is likewise surrounded by a capsule (not shown), having only an opening at the front of the clamping tool. By this arrangement, the protective gas fed into the glass tube, is collected in the upper capsule, thus avoiding tempering or annealing the reed 2 during the sealing process. In addition several important parts are required in performing the sealing process, including an upper oven 10 and a lower oven 11. These parts referred to herein as "oven" and indicated by the reference numerals 10 and 11 schematically represent heater windings which are required for the melting of the glass. Between the ovens 10 and 11 are arranged an adjusting coil 12 for producing an electromagnetic field, and the clamping tools 13 that serve to retain the glass tube in position during the further steps of the operation. Between the lower oven 11 and the feeder portion 1' there is a glass-tube limit stop 14 capable of being moved independently.

FIG. 2 shows the step of moving the feeders 1, 1' and 1", as well as the glass-tube limit stop 14 into the machine, in the direction indicated by the arrows. The feeder devices are all moved into the machine at the same time.

FIG. 3 shows feeder devices 1, 1' and 1" as moved into the machine in the horizontal direction, of which feeder devices 1 and 1' are then respectively moved in the direction of the associated clamping tools 5 and 6. At the same time the glass-tube limit stop 14 is moved towards the lower oven 11, and upon reaching a predetermined position, the slide 4 is pulled away from below the glass tube 3 inserted in the feeder device 1". On account of this, the glass tube 3 will fall out of the feeder 1" and through both the oven 10 and the adjusting coil 12 and is retained with one end in the oven 11 by the action of the glass-tube limit stop 14, which prevents the tube from dropping further.

FIG. 4 shows the receiving and gripping of the reeds 2 and 2' by the closing of the clamping tools 5 and 6.

FIG. 5 shows the seizing of the glass tube by the holding device 13, the withdrawal of the limit stop 14, and the return of the feeder devices 1 and 1' from the clamping tools 5 and 6. The feeder devices 1, 1' and 1", as well as the slide 4 and the glass-tube limit stop 14 are now again moved out of the machine.

FIG. 6 shows the condition of the machine subsequent to the moving of feeder devices 1, 1' and 1" out of the machine. The reeds 2 and 2' are now seized by the clamping tools 5 or 6 respectively.

FIG. 7 shows the introduction of the adjusting contacts 15 and 16 in the course of the continuing operating cycles.

In FIG. 8 there is shown the turning of the clamping tools 5 and 6 about the center of rotation 17 or 17' respectively, in the course of which the free end of the reeds 2 or 2' projecting out of the tools 5 or 6, is moved in direction of the adjusting contacts 15 or 16 respectively.

FIG. 9 shows the operating cycle during which, the adjusting contacts 15 and 16 touch the reeds 2 or 2', and the rotary movement of the clamping tools 5 and 6 is switched off. Instead of mechanically acting types of adjusting contacts 15 and 16 it is also possible to utilize a photoelectrically acting type of contact arrangement.

FIG. 10 shows the movement of the adjusting contacts 15 and 16 out of the machine after the reeds are properly aligned by the clamping tools above and below the glass tube.

FIG. 11 shows the closing of the machine. This is effected by lowering the ovens 10 and 11 which are arranged on one common part of the machine, as well as by lowering the glass-tube holding devices 13, with the glass tube 3 clamped therein, as well as the adjusting coil 12, in the direction of clamping tool 6. The end of the reed 2', at the termination of this process, is located within the one end of the glass tube 3. At the same time the clamping tool 5 with the reed 2 clamped therein, is moved toward clamping tool 6.

Figure 15:
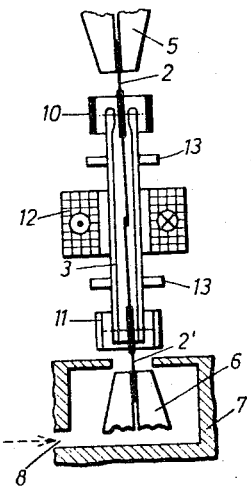

In FIG. 15 the adjusting coil 12 is energized in addition to the upper oven 10, for producing a holding field. By switching-on the upper oven 10, the upper edge of the small glass tube 3 is caused to melt slowly.

Figure 16:
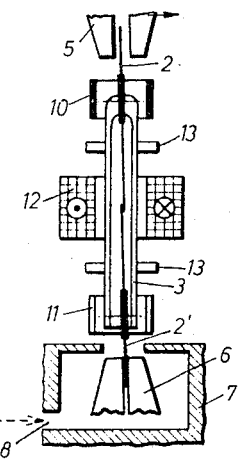

In FIG. 16 the upper melting point within the oven 10 is shown in its completed state. Since the free end of reed 2 is retained by the holding field of the adjusting coil 12 together with reed 2′, the clamping tool 5 which served to hold the other end of the reed 2, may now be released.

Figure 17:
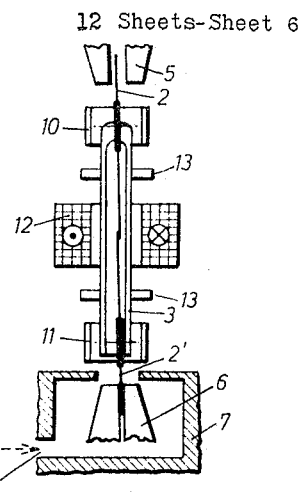

FIG. 17 shows the upper oven 10 in the switched-off condition.

Figure 18:
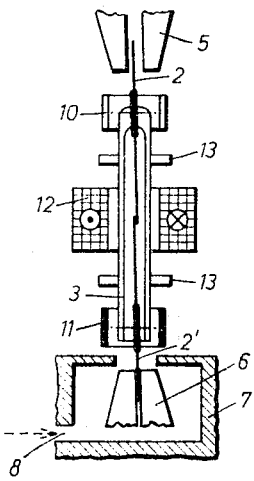

In the operating cycle shown in FIG. 18 the reeds 2 and 2′ are held in contacting position by maintaining the magnetic field of the adjusting coil 12, until the upper melting point has hardened. At the same time the lower oven 11 is switched on.

Figure 19:
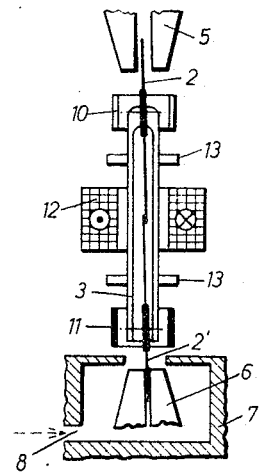

During the operating cycle shown in FIG. 19 the strong protective gas which was blown into the opening 8 of the chamber 7 is merely changed into a weak protective gas, without causing an interruption.

Figure 20:
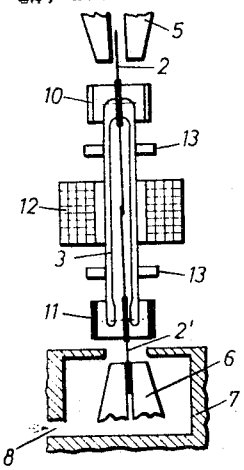

During the operating cycle shown in FIG. 20 the magnetic holding field of the adjusting coil 12 is de-energized. Due to the fact that the lower oven 11 remains in its switched-on condition, the lower edge of the small glass tube 3 slowly starts to be deformed at the sealing point of reed 2′.

Figure 21:
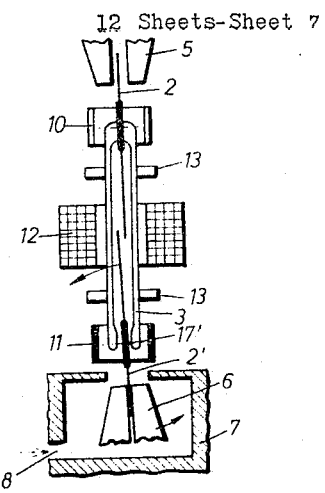

FIG. 21 shows the turning of the clamping tool 6 within the chamber 7 about the center of rotation 17′. This center of rotation 17′ is positioned within the sealing point of reed 2′, so that in the event of a correction of the contact airgap between the two reeds, the sealing point of reed 2′ can be held in the center of the lower end of the glass tube 3. By slewing the clamping tool about the center of rotation 17 the two reeds 2 and 2′ are opened at the overlapping point.

Figure 22:
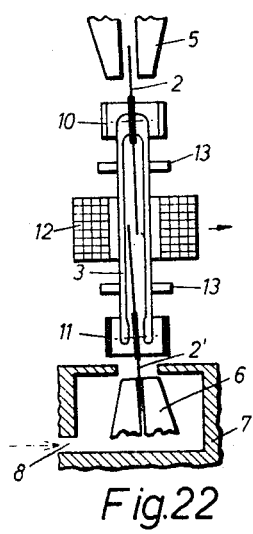

FIG. 22 shows the stage of displacing the glass tube with the sealed upper reed by a distance corresponding to a predetermined airgap. The ovens 10 and 11 do not follow this movement. The sealing point of the lower reed 2′ is now exactly located in the center of the end of the glass tube 3.

Figure 23:
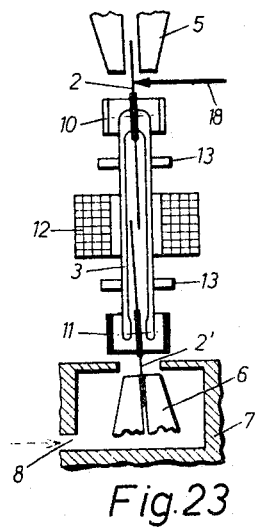

FIG. 23 shows how, as a further operating cycle, a feeling or sensing device 18 is applied to the end of reed 2 projecting out of the glass tube 3, to establish an electrical contact wtih the aid of a slight spring action.

Figure 24:
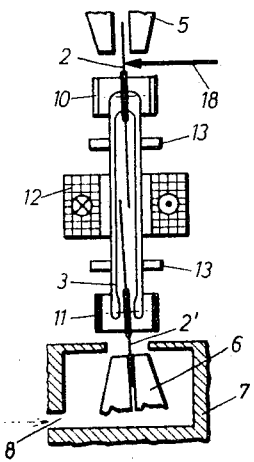

In the operating cycle shown in FIG. 24 the reeds 2 and 2′ are widely spaced at the overlapping point, and the magnetic field of the adjusting coils 12 is switched on.

Figure 25:
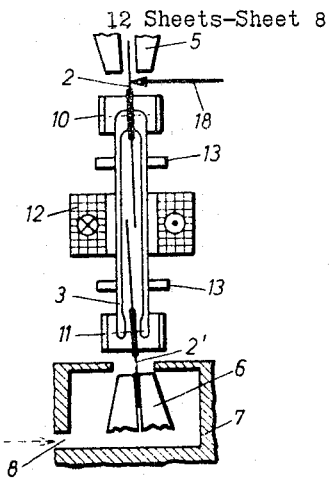

In the operating cycle shown in FIG. 25 the lower oven 11 which had been on to pre-melt the edge of the glass tube, is now switched off.

Figure 26:
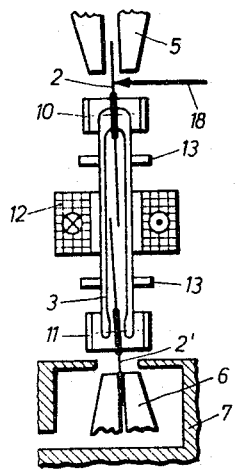

In the operating cycle shown in FIG. 26 the weak protective gas that was blow through opening 8 of chamber 7, is now shut-off entirely.

Figure 27:
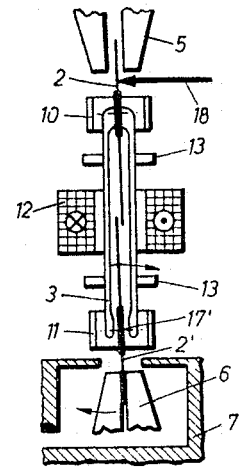

FIG. 27 shows the turning or twisting of the lower reed 2′ about the center of rotation 17′ towards the upper reed 2, with the magnetic field of the adjusting coil 12 being in the energized state.

Figure 28:
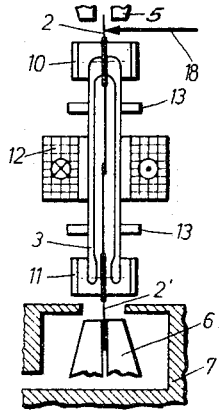

FIG. 28 shows a further operating cycle during which, upon the attraction of the two reeds 2 and 2′ to close the contacts, the rotary movement of the lower clamping tool 6 is terminated to establish a predetermined position.

Figure 29:
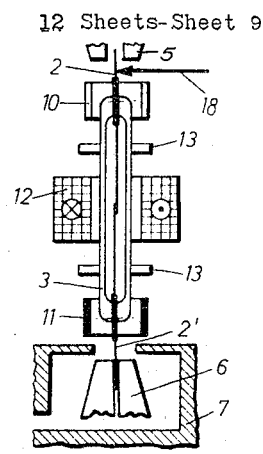

During the operating cycle shown in FIG. 29 the lower oven 11 is switched on again in order to complete the lower sealing point at the reed 2′.

Figure 30:
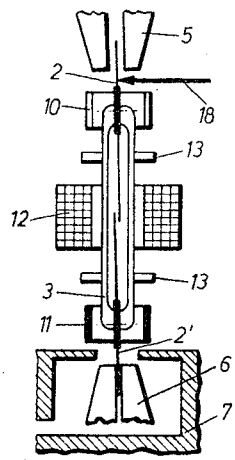

In FIG. 30 the magnetic field of the adjusting coil 12 is switched-off during the switched-on condition of the lower oven 11.

Figure 31:
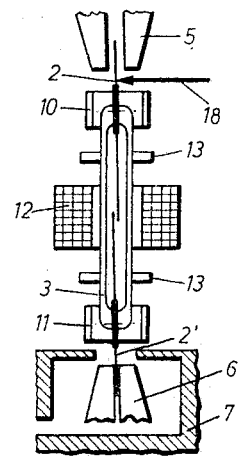

FIG. 31 shows the switching-off of the lower oven 11 subsequent to the completion of the lower sealing point.

Figure 32:
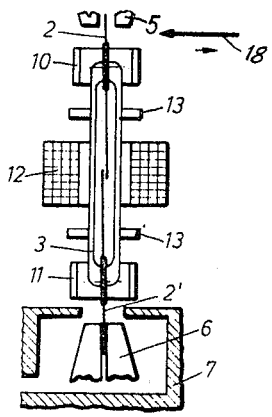

In the further course of operation shown in FIG. 32, the sensing or feeling device 18 is removed from its point of application at the outer end of reed 2.

Figure 33:
Figure 33:
Figure 33:
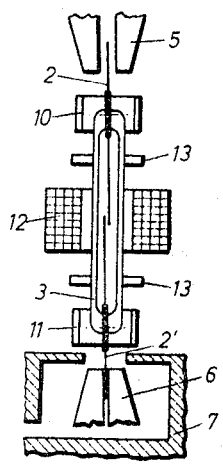

FIG. 33 shows the completed reed contact with the machine at a standstill, in order to allow cooling of the lower sealing point.

Figure 34:
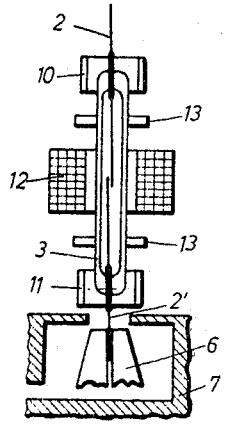

Thereafter, the machine, as shown in FIG. 34, is opened by removing the previously opened clamping tool 5.

Figure 35:
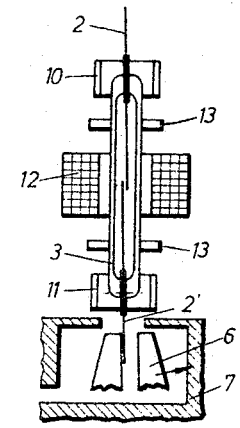

FIG. 35 shows the opening of the lower clamping tool 6.

As shown in FIG. 36, the part of the machine containing the upper oven 10, the finished reed contact clamped in the holding devices 13, the lower oven 11, and the adjusting coil 12 is moved upward. The upper clamping tool 5 has meanwhile reached its extreme position.

FIG. 37 shows the opening of the holding devices 13, so that the finished reed contact may be removed from the machine either upwards or downwards.

FIG. 38 shows the last operating portion during which, by turning the clamping tools 5 and 6 into their starting position prior to the sealing process, the machine is placed in condition to perform further sealing of reeds 2 and 2′ in a glass tube 3.

Figure 3:
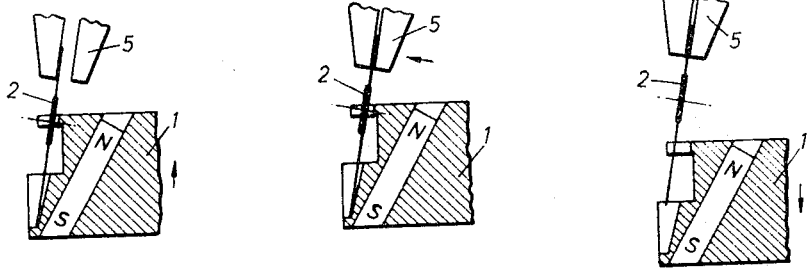
Figure 4:
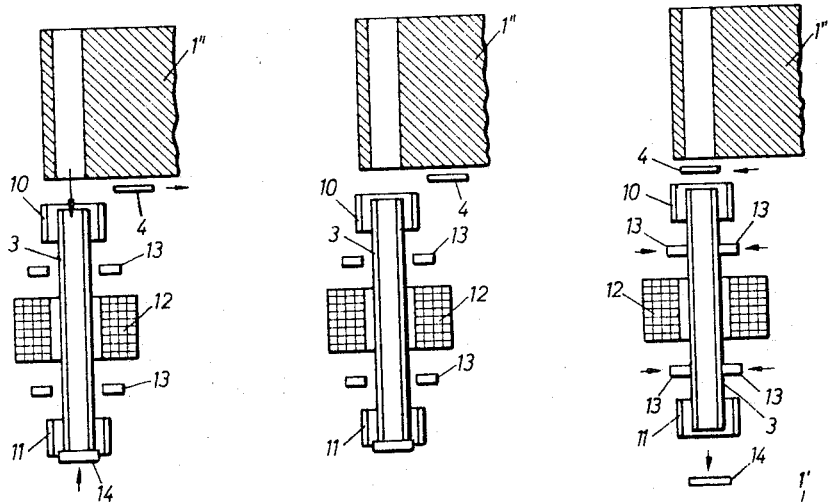
Figure 5:
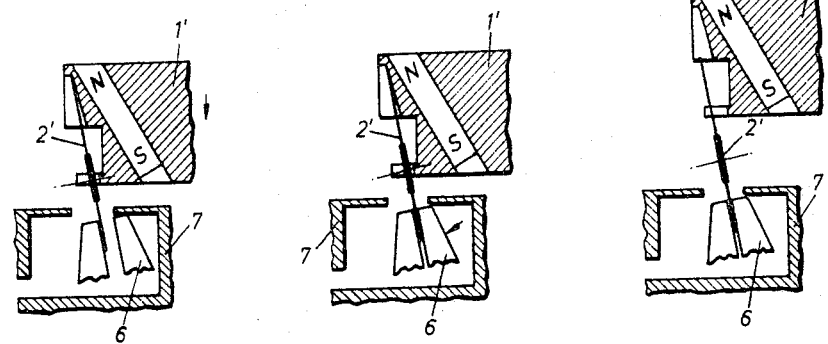
Figure 6:
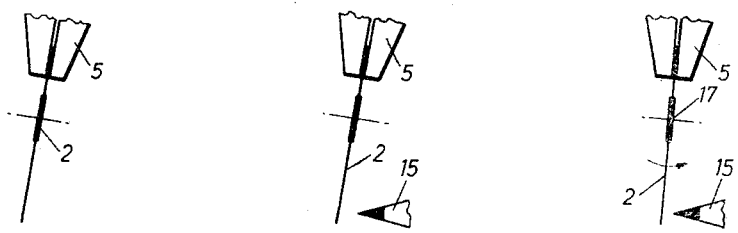
Figure 6:
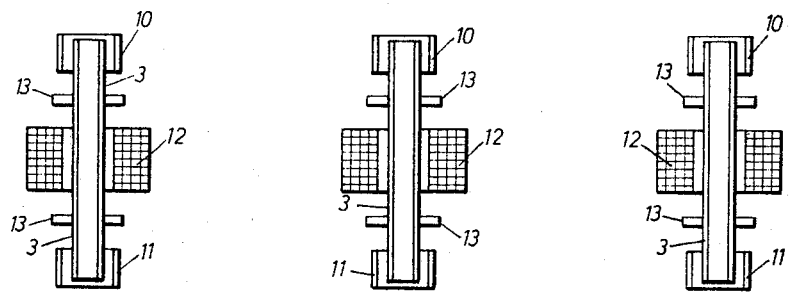
Figure 6:
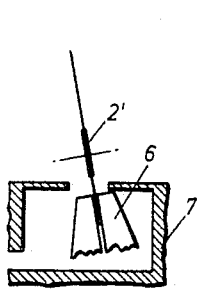
Figure 7:
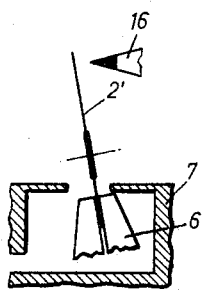
Figure 8:
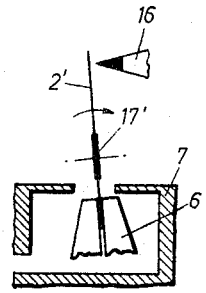
Figure 12:
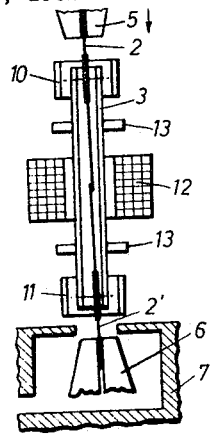
FIG. 12 shows the machine in its condition upon termination of the closing movement.
Figure 13:
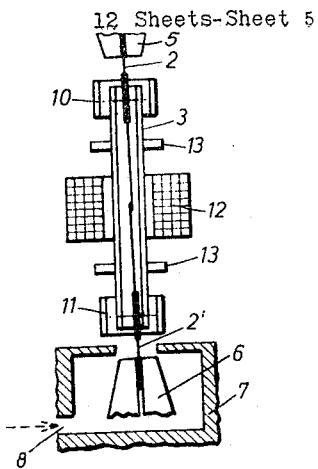
FIG. 13 shows the stage wherein a strong protective gas is blown into the opening 8 of the chamber 7 during a further portion of the operating cycle. The gas prevents damage to the reeds during heating, such as caused by tempering or annealing.
Figure 14:
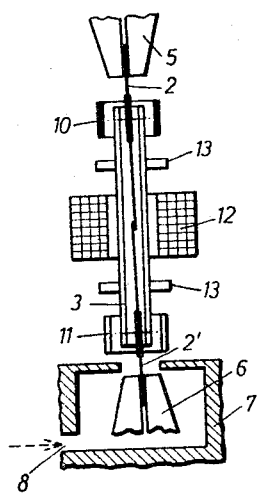
FIG. 14 shows the upper oven 10 in the switched-on condition.
Figure 39:
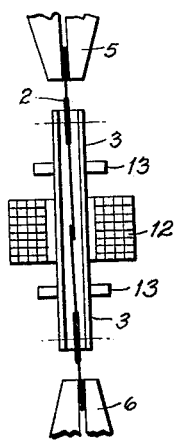

FIG. 39 again shows parts of the machine, with the position of the various elements corresponding to the operating cycle shown in FIG. 12. The reeds 2 and 2′ are positioned inside the glass tube prior to the beginning of the upper sealing operation. Upon termination of the pre-adjustment, the upper reed 2 is brought into the sealing position. The lower reed 2′ is staggered, by an amount which corresponds to the future reed spacing at the overlapping point of the reeds 2 and 2′, from the center of the sealing area at the lower end of the glass tube 3. The adjusting coil 12 is not yet energized.

Figure 40:
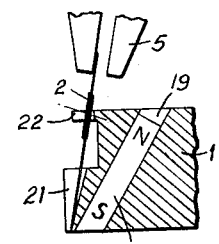

FIG. 40 shows part of the feeder device 1 or 1′ in a sectional view. This feeder device comprises a non-magnetic material. A permanent magnet 20 is inserted into one hole 19 and is polarized in the longitudinal direction, to produce a strong magnetic field. The reeds 2 or 2′ respectively are inserted into recesses in the front feeder device. The recesses are so embodied that the reeds 2 or 2′ within the feeder device 1 or 1′ are forced to assume a predetermined position. In this position they are held by the magnetic field of the permanent magnet 20. It is also then possible to align, at both the contacting side and the sealing point, such reeds which are bent or distorted at the outer ends or at the contacting end, and the reeds may be introduced into the clamping jaws of the clamping tool 5 or 6 respectively, which perform the clamping action with their broad sides.

Figure 41:
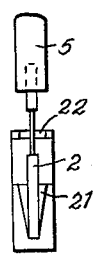

FIG. 41 is a top view of the feeder device 1 or 1′ which is shown in a side view in FIG. 40, looking at the front narrow edge. The reeds 2 or 2′ are automatically inserted into a desired position by the action of the lower prism guide 21 and the upper prism guide 22, by which they are received with their outer ends and held by the clamping tools 5 or 6 respectively.

Figure 42:

FIG. 42 is the top view of the front edge of the feeder device 1 or 1′ with the reeds 2 or 2′ and the upper prism guide 22 at the cylindrical sealing portion being represented in a sectional view.

Figure 43:
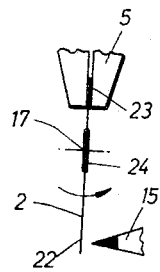

FIG. 43 shows a clamping tool 5 or 6 with a reed 2 or 2′ respectively shown in the clamped position. In the opened condition of the machine the reed 2 or 2′, which is clamped at its outer or soldering end 23, is turned with its inner contacting end 22 towards an adjusting contact, 15 or 16, and about a center of rotation 17 or 17′ respectively. This adjusting contact 15 or 16 is brought exactly to the point at which the contacting end 22 of the reed 2 or 2' is supposed to lie in the finished state. Upon establishing a contact with either the reed 2 or 2', this adjusting contact switches off the rotary movement of the clamping tool 5 or 6. In this way it is possible to compensate for bends or twists appearing in the other transverse axis. The rotatable clamping tool 5 or 6 thus has an advantage over the rigid clamping tool which is only capable of being readjusted or turned in the horizontal direction. This advantage is shown in the following drawings.

Figure 44:
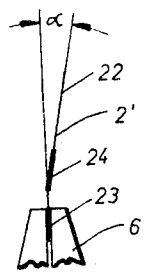

FIG. 44 shows a reed 2 or 2' which is bent at an angle $\alpha$ between the contacting end 22 and the soldering end 23. For example, if such a reed is clamped by a rigid clamping tool 5 or 6, or one that is only capable of being moved horizontally and vertically, then, in the center position of the clamping tool, the contacting point is off center in accordance with the size of the angle $\alpha$ and the position of the bending point, and is inclined by $\alpha°$.

Figure 45:
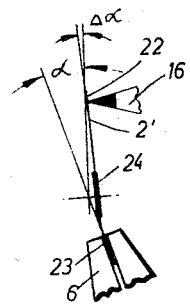

If, as shown in FIG. 45, the same reed 2 or 2' is preadjusted by a clamping tool 5 or 6 capable of being rotated about a central point 17 or 17', and is moved towards an adjusting contact 15 or 16, there will be substantially no off-center condition between the glass tube and the contacting point 22, and the angle of inclination of the contacting point will only amount to a fraction of the angle $\alpha$. This is very important in the manufacture of reed contacts, since during the magnetic holding the position of the upper reed is determined by both the position and the angle of inclination of the contacting end of the lower reed. The geometry of the contacting point is thus of critical importance to the shape of the upper sealing bead. During the sealing of the upper reed the upper clamping tool 5 or 6 remains closed, and is only opened shortly before switching off the upper oven. At this particular time position the glass is already almost completely sealed to the cylindrical shaft 24 of the reeds 2 or 2'. Since the reed 2 or 2', due to the preceding aligning processes, is already located substantially symmetrically in relation to the glass tube, it will thus also be possible to produce a symmetrical sealing bead. The parallel position of the contacting ends 22 of the reeds 2 and 2' is effected subsequent to the opening of the upper clamping tool 5, by the action of the magnetic field produced by the coil 12 that is arranged between the two glass-tube holding device 13. In order to obtain shortest possible manufacturing times, the lower oven 11 is switched on during the time required for the cooling of the upper sealing point. The adjustment of the contact spacing is effected during the last third of the burning time of the lower oven 11.

Figure 46:
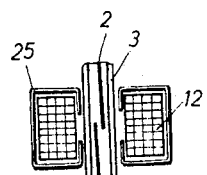

FIG. 46 shows the magnetic seal or shunt 25 which is arranged around the adjusting coil 12, and which serves to concentrate or focus the magnetic field produced by the coil 12, at the ovrelapping point of the reeds 2 and 2' within the glass tube 3. On account of this there are substantially smaller differences obtained with respect to the extent of deviation from the rated values of the finished reed contacts.

The adjustment of the contact spacing may be effected purely mechanically as well as magnetically. In the case of a mechanical adjustment the two reeds 2 and 2' are at first brought into contact with one another at the overlapping point and, proceeding from this position, one of the two reeds is adjusted to the mechanically predetermined contact spacing. In the case of the magnetic adjustment, the action of a constant magnetic field in the adjusting coil 12 causes the contact to respond after having established the respective spacing between the reeds, whereupon the movement of the reeds is switched off.

During a continuous operation the feeder of the machine may be charged with the reeds 2 and 2' and with a glass tube 3 for the next successive sealing process of the next reed contact during the sealing time for the previous reed contact.

The configurations described and illustrated herein are intended as being only exemplary and should not be construed as limiting the scope of the invention as set forth in the appended claims.

What is claimed is:
1. A method of sealing contact reeds in a glass tube comprising the steps of:
   supporting the glass tube and reeds at opposite ends of said tube in a vertical position,
   aligning the tube and reeds with a heating fixture positioned between the reeds,
   releasing the tube to fall into the fixture at a predetermined position with the ends of the tube enclosed by respective heating elements of the fixture,
   clamping the tube in the fixture,
   inserting the aligned reeds into the respective tube ends to form a predetermined overlap at the inner portion,
   establishing a magnetic field about the tube at the overlapping portion to maintain the reeds in a contacting position,
   heating one end of the glass tube to seal one reed therein while maintaining said reeds in said contacting position until the seal is completed,
   releasing the reed at the sealed end and turning off the heat thereat,
   heating the other end of the glass tube,
   removing the magnetic field after heating the other end of the tube,
   rotating the other reed inside the tube about a center within the other heated end to establish a predetermined gap between the overlapped reeds before completing the other seal,
   re-establishing the field after establishing said predetermined gap,
   turning off the heat at the other end,
   rotating said other reed further to reset the gap to the position at which the magnetic field closes the contacts,
   reheating to complete the seal at the other end,
   removing the field during reheating, and
   turning off the heat after sealing the other end.
2. The method of claim 1 including introducing a protective gas into the tube during heating to prevent changing the properties of the reeds.

References Cited by the Examiner
UNITED STATES PATENTS

| | | | |
|---|---|---|---|
| 2,406,008 | 8/1946 | Ellwood | 29—155.5 |
| 2,406,021 | 8/1946 | Little | 29—155.5 |
| 2,506,414 | 5/1950 | Ellwood | 29—155.55 XR |
| 2,648,167 | 8/1953 | Ellwood | 200—87 |
| 2,882,648 | 4/1959 | Hovgaard | 65—32 |

JOHN F. CAMPBELL, *Primary Examiner.*

WHITMORE A. WILTZ, *Examiner.*

R. W. CHURCH, *Assistant Examiner.*